US012522476B2

(12) United States Patent
Bitzi et al.

(10) Patent No.: US 12,522,476 B2
(45) Date of Patent: Jan. 13, 2026

(54) METHOD FOR CREATING AN ELEVATOR SHAFT OF AN ELEVATOR SYSTEM

(71) Applicant: Inventio AG, Hergiswil (CH)

(72) Inventors: Raphael Bitzi, Lucerne (CH); Bjarne Lindberg, Hellbühl (CH)

( * ) Notice: Subject to any disclaimer, the term of this patent is extended or adjusted under 35 U.S.C. 154(b) by 30 days.

(21) Appl. No.: 18/693,554

(22) PCT Filed: Sep. 20, 2022

(86) PCT No.: PCT/EP2022/075995

§ 371 (c)(1),
(2) Date: Mar. 20, 2024

(87) PCT Pub. No.: WO2023/046643

PCT Pub. Date: Mar. 30, 2023

(65) Prior Publication Data

US 2024/0391738 A1 Nov. 28, 2024

(30) Foreign Application Priority Data

Sep. 27, 2021 (EP) .................................... 21199068

(51) Int. Cl.
*B66B 19/00* (2006.01)
*E04F 17/00* (2006.01)

(52) U.S. Cl.
CPC ............ *B66B 19/00* (2013.01); *E04F 17/005* (2013.01)

(58) Field of Classification Search
CPC ...................................................... B66B 19/00
See application file for complete search history.

(56) References Cited

U.S. PATENT DOCUMENTS 3,845,842 A * 11/1974 Johnson .................. B66B 17/12 187/401
9,517,919 B2 * 12/2016 Kalliomäki ............. B66B 5/282
9,546,074 B2 * 1/2017 Okamoto .................. B66B 5/06
12,017,886 B2 * 6/2024 Haikonen ........... B66B 11/0005
2022/0297977 A1 * 9/2022 Jussila .................. B66B 5/0031
(Continued)

FOREIGN PATENT DOCUMENTS

CN 208531965 U * 2/2019
CN 112723106 A 4/2021
DE 10212268 A1 1/2003
(Continued)

OTHER PUBLICATIONS

Machine translation of CN 208531965 U, Shen et al. (Year: 2019).*

*Primary Examiner* — Minh Truong
*Assistant Examiner* — Michelle M Mudwilder
(74) *Attorney, Agent, or Firm* — Schlee IP International, PC; Alexander R. Schlee; Pascal A. Schlee

(57) ABSTRACT

A method for creating an elevator shaft for an elevator system, wherein the elevator shaft is oriented mainly vertically, uses a plurality of base modules placed on one another. The shaft is upwardly closed off by a top module and forms a travelway for a car of the elevator system. In a normal operation of the elevator system, the car is moved at a nominal speed within the travelway. According to the method, an intermediate element having an intermediate element height is arranged between an uppermost one of the base modules and the top module, wherein the intermediate element height is dependent on the nominal speed of the car.

10 Claims, 2 Drawing Sheets

(56) References Cited

U.S. PATENT DOCUMENTS

| | | | | |
|---|---|---|---|---|
| 2024/0017965 | A1 * | 1/2024 | Bellissimo | B66B 5/0087 |
| 2024/0217779 | A1 * | 7/2024 | Venho | B66B 19/00 |

FOREIGN PATENT DOCUMENTS

| | | | | | |
|---|---|---|---|---|---|
| DE | 202014000273 | U1 | * | 4/2014 | B66B 11/00 |
| EP | 0357737 | B1 | | 8/1991 | |
| EP | 1780162 | A1 | | 5/2007 | |
| EP | 2559647 | A1 | * | 2/2013 | B66B 19/00 |
| EP | 2650248 | A1 | | 10/2013 | |
| EP | 3747820 | A1 | | 12/2020 | |

* cited by examiner

METHOD FOR CREATING AN ELEVATOR SHAFT OF AN ELEVATOR SYSTEM

FIELD

The invention relates to a method of creating an elevator shaft for an elevator system wherein the elevator shaft is mainly vertically aligned and forms a travelway for a car of the elevator system, which car is moved at a nominal speed within the travelway in normal operation of the elevator system.

BACKGROUND

The creation or production of an elevator shaft of an elevator system, for example during the construction of a building, and the subsequent installation of the elevator system, is complex and accordingly associated with not inconsiderable costs. Usually, the elevator shaft is first created, in particular of reinforced concrete, and the elevator system with its components such as the car, counterweight, drive machine and guide rails is subsequently installed in the elevator shaft. It has already been proposed to create the elevator shaft from multiple prefabricated modules in which the necessary components are already at least partly preassembled. Prefabrication and pre-assembly takes place in particular in a factory. This procedure requires less time at the construction site. In addition, it has positive effects on the quality of the installation and on the working safety of the installation personnel.

EP 3747820 A1 describes a vertically oriented elevator shaft for an elevator system, and an elevator system having such an elevator shaft. The elevator shaft consists of multiple base modules placed on top of one another, onto which a top module is placed from above, and the elevator shaft is accordingly closed at the top by the top module. The top module accordingly forms a so-called shaft head of the elevator shaft. It contains an entire series of components of the elevator system, including a drive. The elevator shaft forms a travelway for a car of the elevator system which, in normal operation of the elevator system, is moved at a nominal speed within the travelway.

A free space must be present in the shaft head of an elevator system. The free space serves, on the one hand, to allow the car to enter into the free space in the event of unbraked travel. On the other hand, in the mentioned case, the free space must also still provide a sufficient safety space for a service technician traveling on the car. The necessary dimensions of the mentioned free space are defined in standards and can differ from country to country. They are also dependent on properties of the elevator system such as, for example, by a so-called buffer stroke of a so-called counterweight buffer. As a result, in elevator systems according to EP 3747820 A1, different top modules are necessary depending on the standard and properties of the special elevator system that are valid in the corresponding country, which differ in particular in height. The mentioned height of the top module of an elevator system according to EP 3747820 A1 is correspondingly determined when carrying out a method for creating the elevator shaft of the elevator system.

EP 1780162 A1, CN 112723106 A, EP 2559647 A1, DE 10212268 A1 and EP 2650248 A1 also describe elevator systems with an elevator shaft composed of prefabricated modules, and accordingly also at least implicitly a method for creating an elevator shaft of an elevator system using prefabricated modules.

SUMMARY

In contrast, it is an object of the invention, in particular, to propose a method for creating an elevator shaft of an elevator system which enables the use of as many standardized components as possible, in particular a standardized top module, and accordingly allows a cost-effective creation of an elevator shaft. According to the invention, this object is achieved by a method having the features described below.

The elevator shaft of an elevator system created using the method according to the invention is mainly vertically aligned and forms a travelway for a car of the elevator system. In normal operation of the elevator system, the car is moved at a nominal speed within the mentioned travelway. To create the elevator shaft, multiple base modules are placed on top of one another, and the elevator shaft is upwardly closed off by mounting a top module. According to the invention, an intermediate element having an intermediate element height dependent on the mentioned nominal speed is provided, and the selected intermediate element is arranged between an uppermost base module and the top module. The intermediate element height is in particular greater with increasing nominal speed. The intermediate module thereby forms at least a part of the free space mentioned above.

The intermediate element is preferably arranged by placing the intermediate element on the uppermost base module. The top module can then be placed on the intermediate element, whereby the elevator shaft is closed at the top.

The aforementioned intermediate element and accordingly the intermediate element height are provided in particular before starting to place the base modules on one another. In particular, only the required components of the selected intermediate element are delivered to the construction site at which the elevator shaft is created. When the elevator shaft is created, the intermediate element is in particular first placed onto the uppermost base module, and then the top module is placed onto the intermediate element. However, it is also conceivable that the uppermost base module and the intermediate element form a unit preassembled, for example, in a factory or on the construction site, and this unit or the uppermost base module is placed together with the intermediate element on the second uppermost base module.

Since the required free space in the shaft head of an elevator shaft depends mainly on the nominal speed of the car movable in the elevator shaft, in the method according to the invention and accordingly when the elevator shaft according to the invention is created, largely identical and accordingly standardized top modules for the elevator shaft of a plurality of different elevator systems can be used. The necessary free space, in particular the required height of the free space, can be ensured by a corresponding adaptation of the intermediate element height of the intermediate element. Since, compared to the intermediate element, which mainly only has guide rails for guiding the car and optionally a counterweight, the top module is designed to be significantly more complex, the effort in producing different intermediate elements is significantly lower than the effort in producing different top modules. The invention accordingly makes it possible to produce the rather complex top modules identically or at least largely structurally identically, and accordingly standardized in a larger number of units and accordingly cost-effectively. The production of intermediate elements with a different intermediate element height is quite simple and accordingly cost-effective in comparison thereto.

In the following, it is assumed that the elevator shaft only forms a travelway for one car. However, it is also possible for the elevator shaft to form more than one, for example two or three, travelways arranged parallel next to one another for one car in each case. The embodiments described here then apply accordingly.

The top module can either form a walk-in machine room or can be designed to be completely open at the bottom in the direction of the intermediate element and the uppermost base element. The elevator system can accordingly be designed with or without a machine room.

In particular, the intermediate module does not have a door opening for a shaft door of the elevator system. It can accordingly be produced very easily and cost-effectively.

The base modules, the top module and the intermediate element in particular each have a cuboid basic shape. They can also have a different basic shape, for example with a circular or oval cross section. The base module and the top module are in particular designed such that they can be placed onto an underlying shaft module, for example by means of a crane.

The individual base modules of the elevator shaft are in particular all identical and accordingly constructed standardized. In particular, it is also possible for the standardized base modules to also be used for elevator shafts of other elevator systems. This enables the production of base modules in a high number of units, which enables a particularly efficient and accordingly cost-effective production of the base modules.

The elevator shaft can have, for example, between 2 and 25 base modules.

It is possible for a lowest base module to differ from the other base modules. The lowest base module can be supported, for example, on a foundation of a building comprising the elevator shaft. It is also possible for a bottom part of the elevator shaft to not be constructed from base modules, but to be manufactured in a conventional manner, for example from steel-reinforced concrete. The mentioned bottom part can extend, for example, over one to three floors of the housing. The lowest base module can then be supported on this bottom part of the elevator shaft.

The car of the elevator system is moved within the travelway formed by the elevator shaft for transporting persons and goods. During normal operation of the elevator system, the car is moved at a maximum at the nominal speed which can be between 0.5 and 4 m/s, for example. Normal operation of the elevator system is to be understood here to mean that passengers and goods are transported between floors during this operation after the elevator system is started up. The normal operation is distinguished in that there are no faults in the elevator system, and also no work is being done by a service technician. The elevator system can, for example, also be operated in a maintenance mode in which the car is moved, for example, at most at a maintenance speed which is usually lower than the nominal speed. During maintenance mode, a service technician can be on the car, for example during the movement of the car.

The nominal speed of an elevator system is a decisive design parameter of an elevator system. All components of the elevator system, such as the drive machine, braking, safety gear, etc., must be designed for the nominal speed. The nominal speed is accordingly more or less predetermined, and it has an influence on the further components of the elevator system. It is accordingly not that easy to change, in particular increase, the nominal speed of an elevator system. The mentioned nominal speed of an elevator system is therefore a fixed value which usually does not change over the lifetime of an elevator system.

As described above, the required height of the free space in the shaft head can be achieved or ensured by a corresponding choice of the intermediate element height. The required height of the free space depends not only on the nominal speed of the car but on some other factors, such as, for example, on upwardly projecting attachments on the car, or a buffer stroke of a counterweight buffer. It is accordingly not possible to determine the required height of the free space and accordingly the intermediate element height solely from the nominal speed of the car. Additional influencing variables are also to be taken into account which are described and specified in standards, for example European Standard EN 81-20-2014 in Chapter 5 “Safety requirements and/or protective measures,” in particular in chapter 5.2, “Well, machine space and pulley rotated.” The nominal speed is a relevant, in particular the most relevant, influence variable when determining the intermediate element height.

In an embodiment of the invention, the intermediate element height of the intermediate element depends on the square of the nominal speed of the car. Since the kinetic energy of the car increases with the square of the speed of the car, a particularly accurate determination of the necessary intermediate element height is accordingly possible.

In an embodiment of the invention, the intermediate element consists only of mainly vertically oriented intermediate element supports which are arranged between the uppermost base module and the top module. The intermediate element is accordingly designed in a particularly simple and inexpensive manner. In particular, it is formed by four intermediate element supports or, if two travel paths are arranged next to each other, by six intermediate element supports. The intermediate element supports have a length that mainly corresponds to the intermediate element height. They are connected, in particular screwed or welded, to the top module in their lower region and to the top module in their upper region. The fastening means necessary for the mentioned fastening, for example in the form of screws or nuts, are not regarded here as part of the intermediate element supports.

In an embodiment of the invention, the intermediate element has vertically oriented intermediate element supports and at least one horizontally oriented intermediate element cross member. The intermediate element cross member can be arranged in a lower region, in an upper region and/or in a central region of the intermediate element supports. The intermediate element has in particular 4, 8 or 12 intermediate element cross members which form one, two or three frames which are connected to the intermediate element supports. The intermediate element supports and the horizontally oriented intermediate element cross members are in particular likewise already connected to one another in the factory and accordingly form an intermediate module. The intermediate module can be placed very easily, for example by means of a crane, onto the uppermost base module and subsequently connected thereto. The creation of the elevator shaft is accordingly very simple. The intermediate element or the intermediate module can also have more than one, for example two horizontally oriented intermediate element cross members, wherein in this case in particular a first intermediate element cross member is arranged in the lower region, and a second intermediate element cross member is arranged in the upper region of the intermediate element supports.

In an embodiment of the invention, the intermediate element supports and/or the intermediate element cross member are made of metal profiles. They can accordingly be produced very easily and accordingly very economically. This also makes it very easy to connect them to the uppermost base module and the top module, for example by screwing or welding them together. The production of metal profiles also results in particularly stable intermediate element supports and/or intermediate element cross members. The metal profiles can be designed, for example, as 0, U, T, or double-T beams, in particular from steel.

Basic structures of the base modules and/or the top module can also be manufactured from such metal profiles.

In an embodiment of the invention, each base module has a door opening for arranging a shaft door. The base modules then have in particular a height which corresponds to a floor height of the building in which the elevator shaft is created. The elevator shaft can accordingly be produced in a particularly simple and cost-effective manner. In particular, the shaft doors are already arranged in the door openings in the factory.

An elevator shaft described above is in particular part of an elevator system which additionally has a car. The car can be moved within the travelway formed by the elevator shaft during normal operation of the elevator system at the nominal speed within the travelway.

In an embodiment of the invention, the elevator system has a counterweight, a suspension means connecting the car and the counterweight, and a counterweight buffer. The counterweight buffer is designed and arranged such that it limits a downwards displacement of the counterweight and can be maximally compressed by the counterweight by a buffer stroke. The intermediate element height of the intermediate element is then dependent on the aforementioned buffer stroke of the counterweight buffer. The intermediate element height of the intermediate element can accordingly be determined very precisely to ensure the necessary free space in the shaft head of the elevator shaft.

With consideration of the aforementioned buffer stroke and the square of the nominal speed of the car, a so-called highest position of the car can be determined from which the necessary safety spaces for service technicians can be determined or specified by standards. The highest position is considered to be the position of the car which results in the upward direction during an unbraked trip of the car. It is determined on the basis of an initial position of the car at the lowest position of the counterweight, i.e., with the counterweight buffer compressed by the buffer stroke. The distance traveled from the starting position is calculated from the speed of the car and the gravitational acceleration from the formula: $\frac{1}{2}*v^2/2*g$, with v as the speed of the car, and g as gravitational acceleration. In the European standard EN 81-20-2014 chapter 5.2.5.6.1 "Extreme position of car, counterweight and balancing weight," 115% of the nominal speed is specified as the speed to be used. Chapter 5.2.5.7 "Refuge spaces on car roof and clearances in headroom" of the aforementioned standard specifies the required safety spaces based on the highest position of the car determined in this way. Corresponding specifications exist in standards applicable in other countries.

The intermediate element height of the intermediate element is accordingly dependent on the highest position of the car dependent on the buffer stroke of the counterweight buffer, the square of the nominal speed and the required safety spaces. This allows an intermediate element height to be determined at which the specifications set out in the standard applicable to a particular elevator system are met. It is possible that the actual selected intermediate element height is greater by a safety margin than the intermediate element height determined as described.

In an embodiment of the invention, the intermediate element height of the intermediate element depends on the presence of a limiting device. The limiting device is designed such that, in a maintenance mode of the elevator system, it limits the movement of the car toward the top module. The necessary intermediate element height can accordingly be determined particularly precisely.

Such limiting devices are used in particular if the mentioned free space is to be as small or low as possible. If such a limiting device is present, the standards allow reduced or lower safety spaces. The limiting device can have, for example, extendable bolts which, in the extended state, prevent a movement of the car beyond a certain height in the elevator shaft. It is also possible for the limiting device to be designed purely electronically.

The described elevator system has in particular a drive machine for driving the suspension means and accordingly for moving the car and a control device for controlling the drive machine. The control device is configured in such a way that the car is moved exclusively within a travelway section formed by the base modules during normal operation of the elevator system. During normal operation of the elevator system, the car accordingly does not protrude into the intermediate element, this only occurs upwards in the case of unbraked travel of the car described above. The intermediate element accordingly serves to cover this special case and to ensure the necessary safety space in the shaft head. This makes it possible, in particular, for the uppermost base module to be designed identically to the further base modules.

Further advantages, features and details of the invention can be found in the following description of embodiments and with reference to the drawings, in which like or functionally like elements are provided with identical reference signs. The drawings are merely schematic and are not to scale.

DETAILED DESCRIPTION

Figure 1:
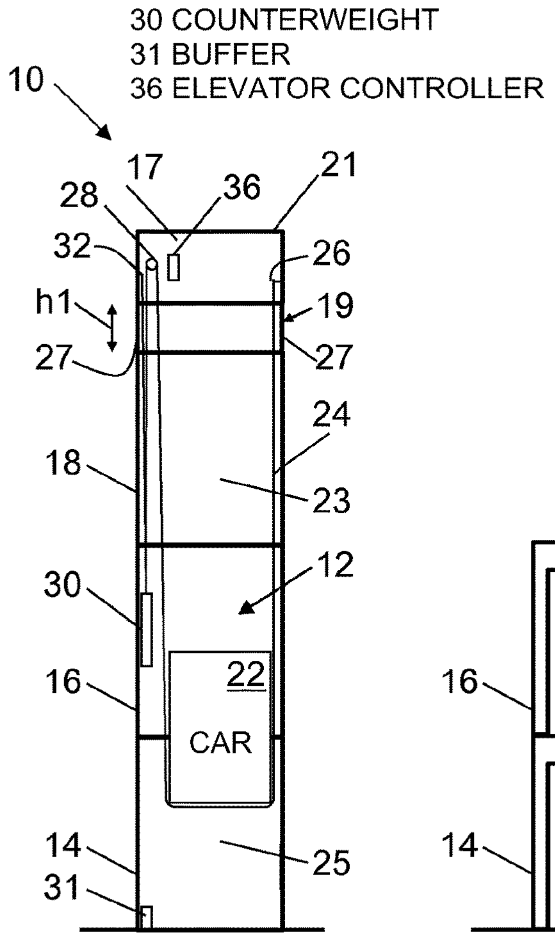
FIG. 1 shows a simplified representation of an elevator system in a side view with a car and an elevator shaft composed of three base modules, one intermediate element, and one top module.

According to FIG. 1, an elevator system 10 has an elevator shaft 12 for a three-story building, which in the present exemplary embodiment is composed of a first base module 14, a second base module 16, a third uppermost base module 18, an intermediate element 19, and a top module 21. In this case, the individual elements are arranged in the mentioned order from the bottom to the top so that the elevator shaft 12 is mainly aligned vertically and is upwardly closed by the top module 21. The elevator shaft 12 can comprise further base modules depending on the number of floors. The base modules 14, 16, 18 and the top module 21 are pre-produced in a factory and provided with elevator components. Subsequently, they are brought to the construction site and put on top of one another. The base modules 14, 16, 18, the top module 21 and the intermediate element 19 each have a cuboid basic shape.

Figure 3:
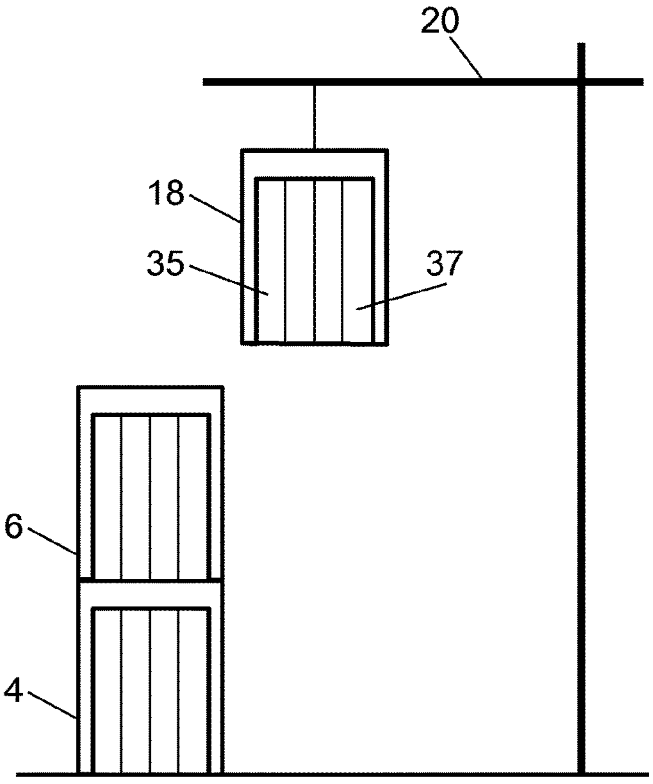
FIG. 3 shows a snapshot when a base module is placed on a yet unfinished elevator shaft of an elevator system.

FIG. 3 shows how the uppermost base module 18 is placed on the second base module 16 from above by means of a crane 20. The second basic module 16 was previously placed in the same way onto the first basic module 14. The base module 14 stands on a foundation (not shown) of the elevator shaft.

Each base module 14, 16, 18 has a door opening 35 for arranging a shaft door 37. The base modules 14, 16, 18 have a height which corresponds to a floor height of the building in which the elevator shaft is created. In contrast, the intermediate element 19 does not have a door opening.

Moreover, the elevator system 10 has a car 22 which can be moved vertically in the elevator shaft 12 along guide rails which are not shown in FIG. 1. The elevator shaft 12 accordingly forms a travelway 23 within which the car 22 can be moved. In the example shown in FIG. 1, the travelway 23 extends over the three base modules 14, 16, 18, the intermediate element 19, and the top module 21. The top module 21 accordingly forms a so-called shaft head 17.

It is also possible for the travelway to not extend into the top module; the top module is accordingly designed as a walk-in machine room. In this case, the intermediate element forms the shaft head which is delimited at the top by a floor of the top module and is accordingly closed.

For this purpose, the elevator system 10 has a load suspension means 24, the first end 26 of which is fixed in the top module 21. It then runs around the car 22 at the bottom and is guided via a drive machine 28 arranged in the top module 21 opposite the first end 26 of the load suspension means 24. From there, it runs through a suspension of a counterweight 30 to its second end 32, which is fixed in the region of the drive machine 28 in the top module 21. The suspension means 24 accordingly connects the car 22 to the counterweight 30. The drive machine 28 can move the load suspension means 24 and accordingly the car 22 within the travelway 23 in the elevator shaft 12. The drive machine 28 is controlled by an elevator controller 36 arranged in the top module 21.

The elevator controller 36 is configured such that it controls the drive machine 28 in such a way that, in normal operation of the elevator system 10, the car 22 is moved at a maximum at a predetermined nominal speed within the travelway 23. The nominal speed is, for example, between 0.5 and 3 m/s. The elevator controller 36 is also configured such that the car 22 is moved exclusively within a travelway section 25 formed by the base modules 14, 16, 18 during normal operation of the elevator system 10.

Figure 2:
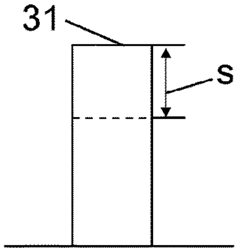
FIG. 2 shows an enlarged, highly schematic representation of a counterweight buffer of the elevator system from FIG. 1.

A counterweight buffer 31, which is shown enlarged in FIG. 2, is arranged below the counterweight 30. The counterweight buffer 31 limits the displacement of the counterweight 30 downwards. It can thereby be maximally compressed by a buffer stroke s. This happens, for example, when the car 22 is moved upwards without braking until the counterweight 30 strikes the counterweight buffer 31 and compresses it at a maximum. In the mentioned case, the car 22 continues to move upwards a little further due to its speed, delayed by the acceleration due to gravity, to a highest position not shown. According to standard EN 81-20-2014 chapter 5.2.5.6.1 "Extreme position of car, counterweight and balancing weight," the highest position is approximately 0.035 times the nominal speed above the initial position of car 22 with the counterweight buffer 31 compressed by the buffer stroke s. The aforementioned highest position is accordingly dependent on the buffer stroke s of the counterweight buffer 31 and the nominal speed of the car 22 or can be determined from the mentioned variables.

In chapter 5.2.5.7 "Refuge spaces on car roof and clearances in headroom," standard EN 81-20-2014 also specifies required safety spaces based on the highest position of the car 22 determined in this way. In this case, minimum distances from a car ceiling and attachments on the car, such as a door drive of the shaft doors or a balustrade, are specified. Starting from the location of the aforementioned highest position of the car 22 with respect to the uppermost base module 18 and the space provided in the top module 21, a height h1 of the intermediate element 19 can accordingly be determined, with which the safety spaces prescribed in the standard are maintained. The intermediate element 19 is therefore selected with an intermediate element height h1 dependent on the nominal speed of the car 22 and is arranged between the uppermost base module 18 and the top module 21. When the elevator shaft 12 is created, the intermediate element 19 is of course first placed onto the uppermost base module 18, and then the top module 21 is placed onto the intermediate element 19.

With the elevator shaft 12 according to FIG. 1, the intermediate element 19 consists only of four mainly vertically oriented intermediate element supports 27 which are arranged between the uppermost base module 18 and the top module 21. The four intermediate element supports 27 are arranged at the four corners of the rectangular cross sections of the uppermost base module 18 and the top module 21. The intermediate element supports 27 have a length which mainly corresponds to the intermediate element height h1. They are connected, in particular screwed or welded, to the uppermost base module 18 in their lower region and to the top module 21 in their upper region. The fastening means (not shown) necessary for the mentioned fastening, for example in the form of screws or nuts, are not regarded here as part of the intermediate element supports 27.

Figure 4:
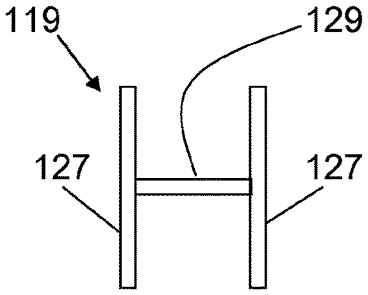
FIG. 4 shows an enlarged representation of an intermediate element in the form of an intermediate module in a first embodiment in a side view.
Figure 5:
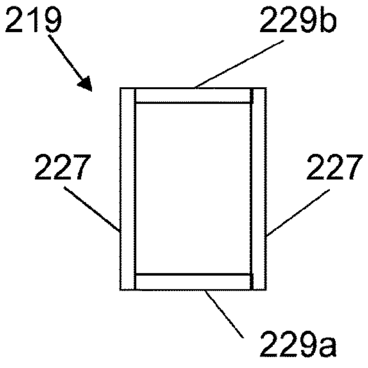
FIG. 5 shows an intermediate element in the form of an intermediate module in a second embodiment in a side view.

In addition to the intermediate element supports, the intermediate element can also be provided via at least one, in particular four or eight, horizontally oriented intermediate element cross members. According to FIG. 4, in an intermediate element 119 in the form of an intermediate module, four intermediate element cross members 129 are arranged in a central region of the intermediate element supports 127. The four intermediate element cross members 129 form a rectangular frame that is connected to the intermediate element supports 127. According to FIG. 5, in an intermediate element 219 in the form of an intermediate module, a first frame formed from four intermediate element cross members 229*a* is arranged in the lower region, and a second frame formed from four intermediate element cross members 229*b* is arranged in the upper region of the intermediate element supports 227.

The intermediate element supports 27, 127, 227 and the intermediate element cross members 129, 229*a*, 229*b* are in particular made of metal profiles. The respective metal profiles can be designed, for example, as U, T, or double-T beams, in particular from steel. Basic structures of the base modules 14, 16, 18 and of the top module 21 can also be manufactured from such metal profiles.

Figure 6:
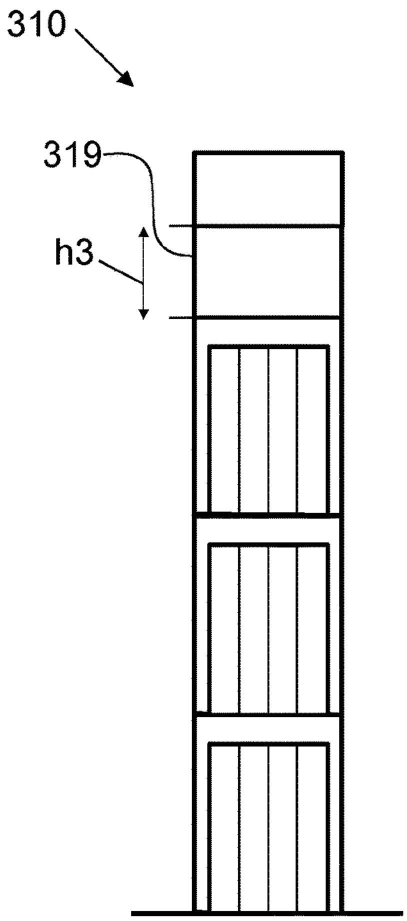
FIG. 6 shows a first elevator shaft with an intermediate element having a first intermediate element height.
Figure 7:
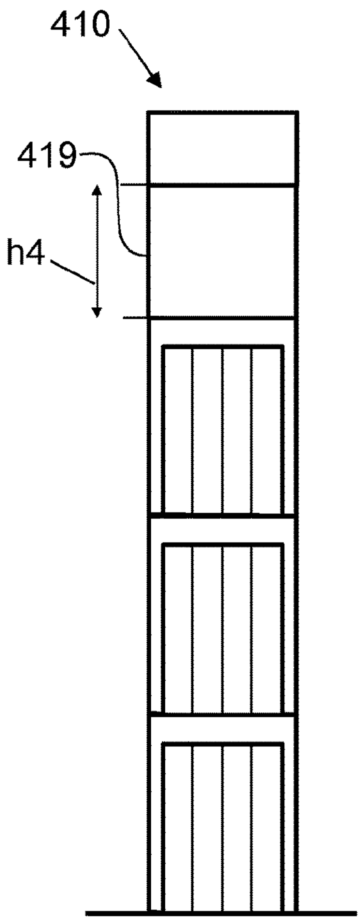
FIG. 7 shows a second elevator shaft with an intermediate element having a second intermediate element height.
Figure 8:
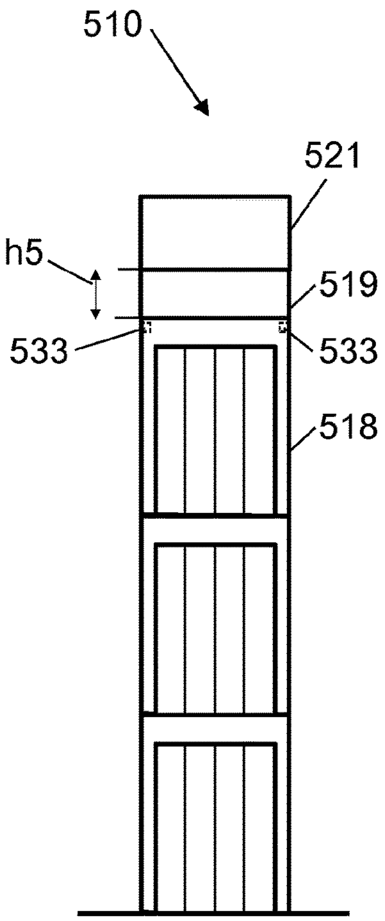
FIG. 8 shows a third elevator shaft with an intermediate element having a third intermediate element height.

The influence of the nominal speed of the elevator car and the presence of a limiting device for limiting the movement of the car toward the top module in a maintenance mode of the elevator system is shown with reference to FIGS. 6, 7 and 8.

In the elevator system 310 according to FIG. 6, the nominal speed of the car is 1.5 m/s, for example. As described above, an intermediate element height h3 of the intermediate element 319 is determined at this nominal speed and the other described influencing variables.

In the elevator system 410 according to FIG. 7, the nominal speed of the car is, for example, 2 m/s. The nominal speed of the car of the elevator system 410 is accordingly greater than the nominal speed of the car of the elevator system 310 from FIG. 6. An intermediate element height h4 of the intermediate element 419, which is greater than the intermediate element height h3 of the intermediate element 319 of the elevator system 310 of FIG. 6, results for the elevator system 410.

In the elevator system 510 according to FIG. 8, the nominal speed of the car is also 1.5 m/s, for example. The nominal speed of the car of the elevator system 510 is accordingly equal to the nominal speed of the car of the elevator system 310 from FIG. 6. However, the elevator system 510 according to FIG. 8 has a limiting device 533 in the form of extendable bolts in the upper region of the uppermost base module 518 for limiting the movement of the car toward the top module 521 in a maintenance mode of the elevator system 510. The limiting device 533 ensures that the car cannot penetrate into the intermediate element 519 during maintenance mode of the elevator system 510. This results in an intermediate element height h5 of the intermediate element 519 for the elevator system 510, which, despite the same nominal speed, is smaller than the intermediate element height h3 of the intermediate element 319 of the elevator system 310 of FIG. 6.

Finally, it should be noted that terms such as "having," "comprising," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for creating an elevator shaft of an elevator system, wherein the elevator shaft is vertically aligned and forms a travelway for a car of the elevator system, which car is moved at a nominal speed within the travelway in normal operation of the elevator system, the method comprising the steps of:

placing multiple base modules on each other forming a travelway section of the travelway of the vertically aligned elevator shaft;

closing the elevator shaft upwards by mounting a top module along the travelway above the base modules, wherein a drive machine is arranged in the top module;

providing a single intermediate element having an intermediate element height dependent on the nominal speed of the car, wherein higher nominal speed correlates to a greater intermediate element height; and arranging the intermediate element in the travelway exclusively between an uppermost one of the base modules and the top module, wherein the intermediate element is configured to form free space in a shaft head of the elevator shaft.

2. The method according to claim 1 including determining the intermediate element height of the intermediate element dependent on a square of the nominal speed of the car.

3. The method according to claim 1 including forming the intermediate element with a plurality of vertically oriented intermediate element supports.

4. The method according to claim 3 including forming the intermediate element with the vertically oriented intermediate element supports connected by at least one horizontally oriented intermediate element cross member.

5. The method according to claim 4 including forming at least one of the intermediate element supports and/or the at least one intermediate element cross member as a metal profile.

6. The method according to claim 1 wherein each of the base modules has a door opening adapted for arranging a shaft door therein.

7. The method according to claim 1 wherein the elevator system has a counterweight, a suspension means connecting the car and the counterweight, and a counterweight buffer arranged below the counterweight, wherein the counterweight buffer is adapted and arranged to limit a downward displacement of the counterweight and can be maximally compressed by the counterweight by a buffer stroke, and wherein the intermediate element height of the intermediate element also is dependent on the buffer stroke of the counterweight buffer.

8. The method according to claim 1 wherein the intermediate element height of the intermediate element also is dependent on a presence of a limiting device in the elevator shaft, wherein the limiting device is adapted to, in a maintenance mode of the elevator system, limit a movement of the car in the travelway toward the top module.

9. An elevator shaft of an elevator system, the elevator shaft being created by performing the method according to claim 1, the elevator shaft comprising:

a plurality of the base modules vertically aligned;

the intermediate element on top of an uppermost one of the base modules;

the top module on top of the intermediate element; and wherein the base modules, the intermediate element and the top module form the travelway.

10. An elevator shaft of an elevator system, wherein the elevator shaft is vertically aligned and forms a travelway for a car of the elevator system, which car is moved at a nominal speed within the travelway in normal operation of the elevator system, the elevator shaft comprising:

at least two base modules placed on each other forming a travelway section of the travelway of the vertically aligned elevator shaft;

a single intermediate element having an intermediate element height dependent on the nominal speed of the car, the intermediate element exclusively being placed above and on an uppermost one of the base modules; and a top module being placed above and on the intermediate element completing the travelway and closing the elevator shaft upwards, wherein a drive machine is arranged in the top module;

wherein higher nominal speed correlates to a greater intermediate element height; and wherein the intermediate element is configured to form free space in a shaft head of the elevator shaft.

* * * * *